(12) United States Patent
Hosbach et al.

(10) Patent No.: US 10,807,505 B1
(45) Date of Patent: Oct. 20, 2020

(54) VEHICLE SEATING ASSEMBLY

(71) Applicant: Ford Global Technologies, LLC, Dearborn, MI (US)

(72) Inventors: Christian J. Hosbach, Taylor, MI (US); John Wayne Jaranson, Dearborn, MI (US); Kevin VanNieulande, Fraser, MI (US); Patrick Maloney, Livonia, MI (US); Vishal Vinayak Nageshkar, Farmington Hills, MI (US); Sangram Tamhankar, Canton, MI (US); Johnathan Andrew Line, Northville, MI (US); Jonathan Paul Weiler, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/453,167

(22) Filed: Jun. 26, 2019

(51) Int. Cl.
    B60N 2/16 (2006.01)

(52) U.S. Cl.
    CPC ............. B60N 2/1635 (2013.01); B60N 2/16 (2013.01)

(58) Field of Classification Search
    CPC ........ B60N 2/16; B60N 2/1635; A47D 1/004; A47C 3/40; A47C 3/24; A47C 3/20
    USPC ............... 297/256.11, 344.18, 344.12, 344.2
    See application file for complete search history.

(56) References Cited

U.S. PATENT DOCUMENTS

| | | | |
|---|---|---|---|
| 5,720,524 A * | 2/1998 | Hall | A47C 3/18 108/65 |
| 9,498,070 B2 * | 11/2016 | Michelson | A47D 1/0081 |
| 2015/0108800 A1 | 4/2015 | Renaudin et al. | |

FOREIGN PATENT DOCUMENTS

| | | | | |
|---|---|---|---|---|
| CN | 207580019 U | 7/2018 | | |
| CN | 109549381 A | * | 4/2019 | |
| FR | 2656998 A1 | * | 7/1991 | A47C 3/24 |
| JP | 2004338426 A | | 12/2004 | |
| KR | 20120005086 A | | 1/2012 | |
| KR | 20180045428 A | | 5/2018 | |

* cited by examiner

*Primary Examiner* — Milton Nelson, Jr.
(74) *Attorney, Agent, or Firm* — David Coppiellie; Price Heneveld LLP

(57) ABSTRACT

A seating assembly includes a shell assembly having a seat base coupled with a seatback. A base assembly is operably coupled with the shell assembly. The base assembly includes an outer portion defining an opening and an engagement slot. An inner portion is positioned through the opening of the outer portion. The inner portion includes a sidewall defining a receiving well. A barrel is positioned around the inner portion. The barrel defines a track extending helically from a lower end of the barrel to an upper end of the barrel. A bearing is received by the engagement slot, the receiving well, and the track. The bearing is movable along the engagement slot and the track simultaneously. An actuator is operably coupled with the barrel and is configured to rotate the barrel. Rotation of the barrel is configured to vertically translate the inner portion relative to the outer portion.

20 Claims, 3 Drawing Sheets

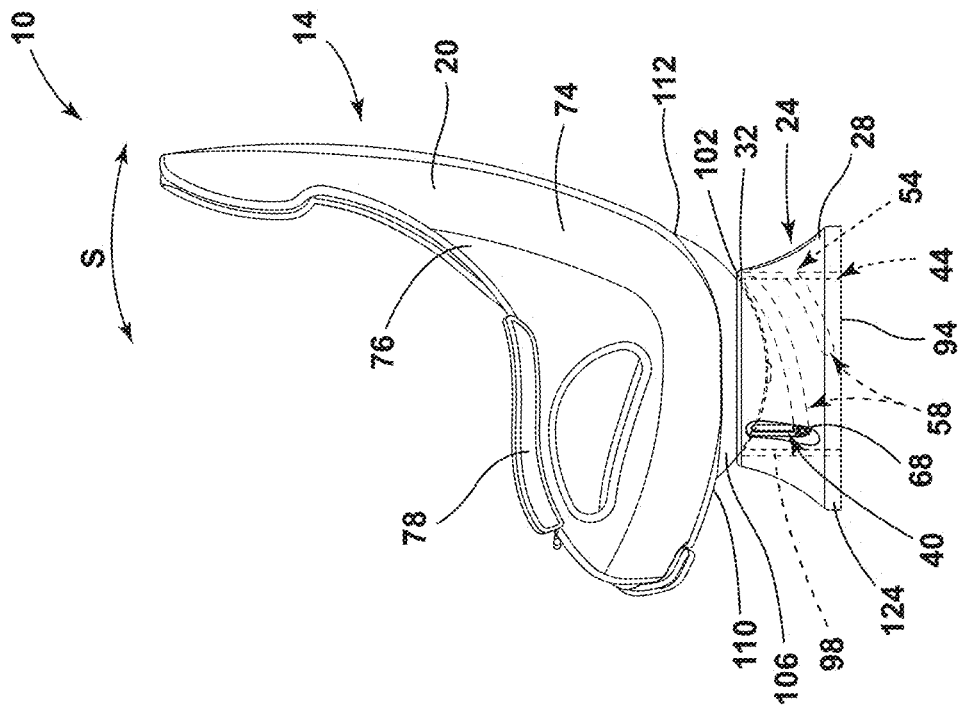
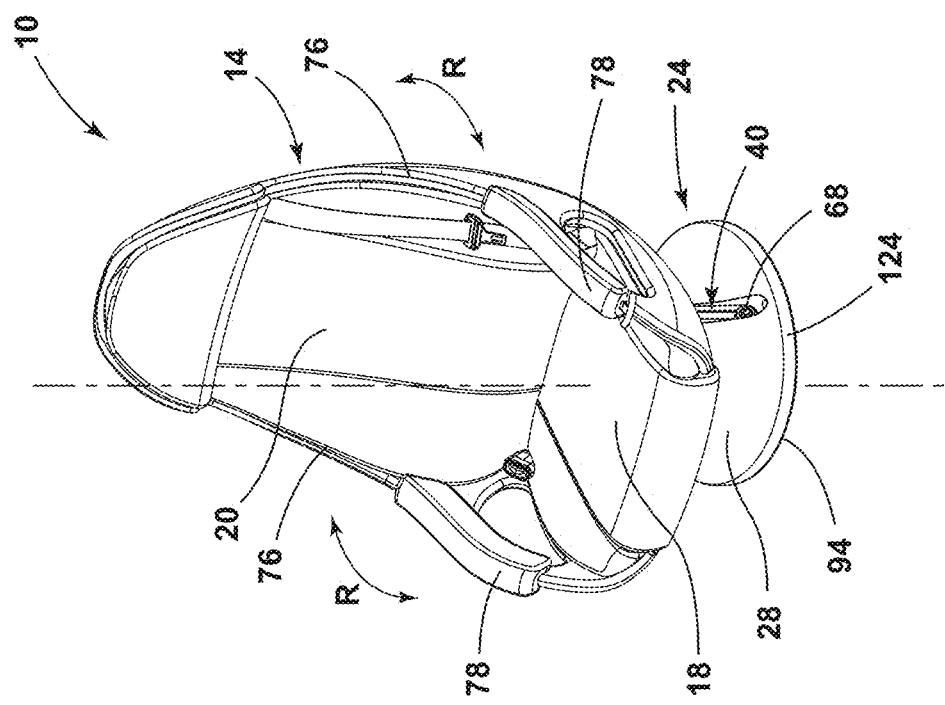

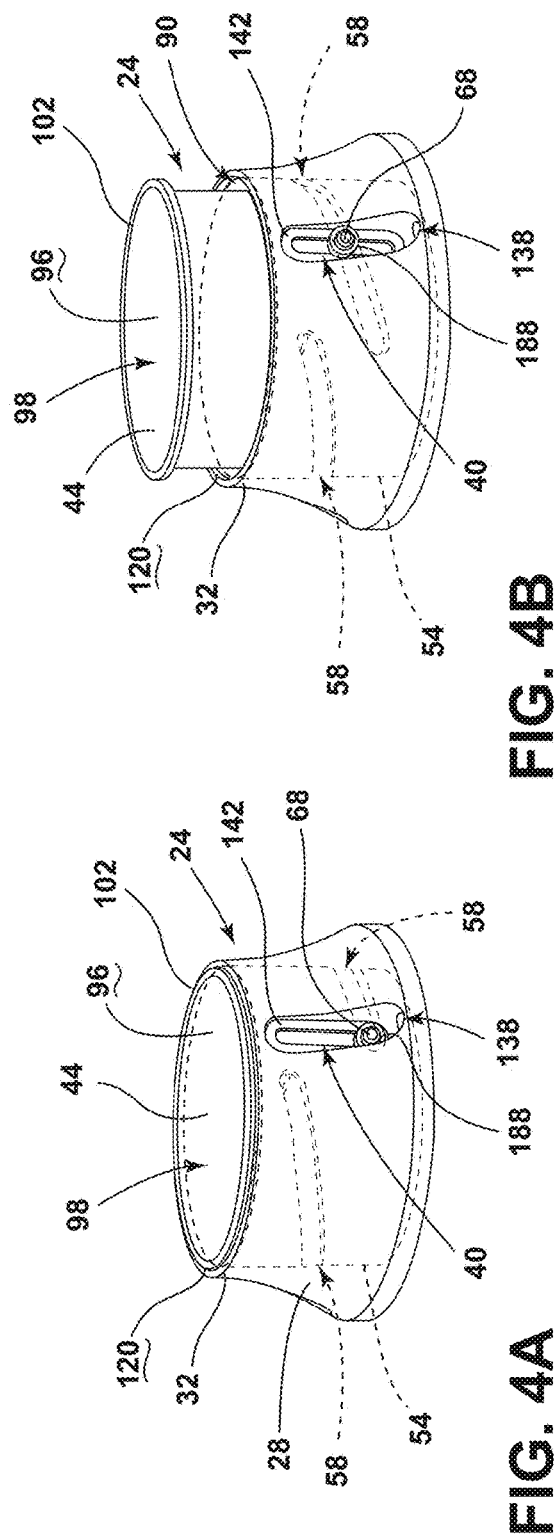
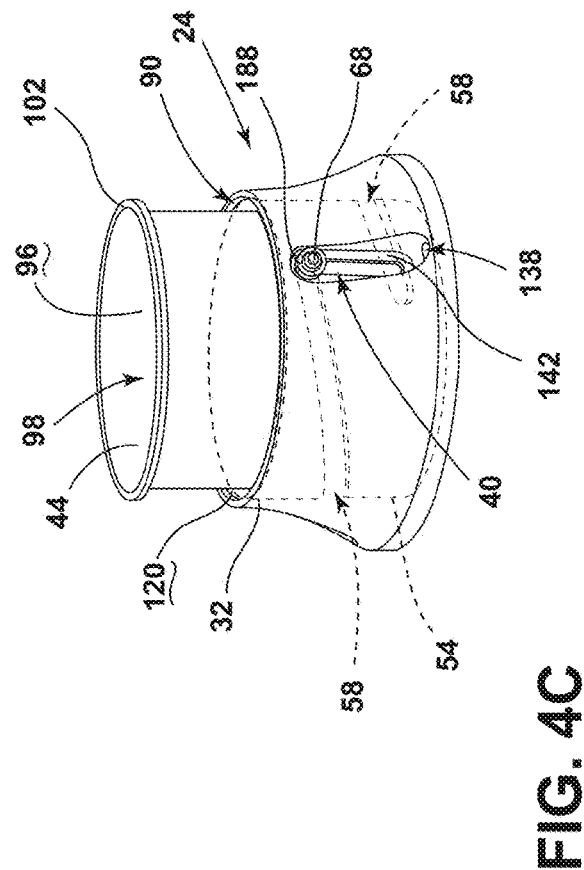
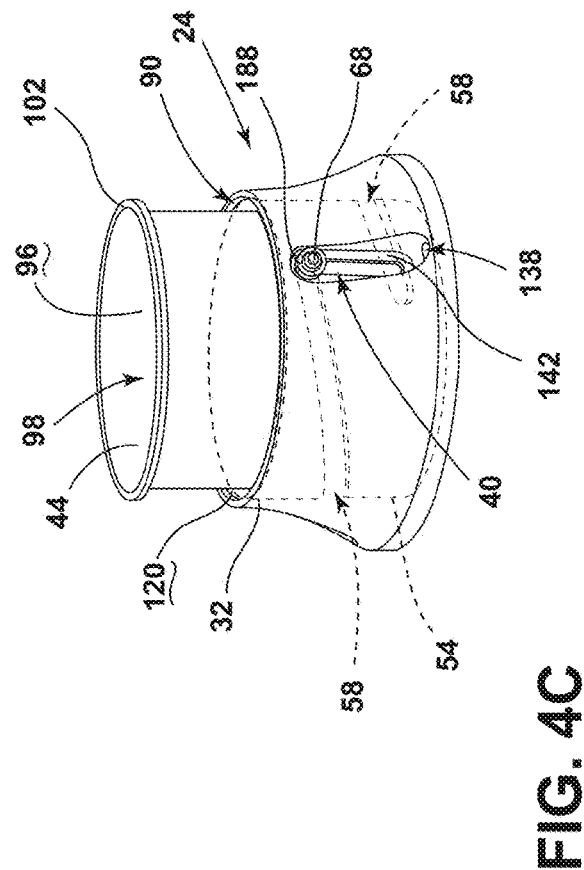

VEHICLE SEATING ASSEMBLY

FIELD OF THE DISCLOSURE

The present disclosure generally relates to a vehicle seating assembly, and more specifically to a vehicle seating assembly having a lift mechanism.

BACKGROUND OF THE DISCLOSURE

Currently, seating assemblies include a seat base and a seatback. With variation in occupant stature, occupants are interested in seating designs that allow the vertical adjustment of the seating assembly.

SUMMARY OF THE DISCLOSURE

According to one aspect of the present disclosure, a seating assembly includes a shell assembly having a seat base coupled with a seatback. A base assembly is operably coupled with the shell assembly. The base assembly includes an outer portion defining an opening and a vertically extending engagement slot. An inner portion is positioned through the opening of the outer portion. The inner portion includes a sidewall defining a receiving well. A barrel is positioned around the inner portion. The barrel defines a track extending helically from a lower end of the barrel to an upper end of the barrel. A bearing is received by the engagement slot, the receiving well, and the track. The bearing is movable along the engagement slot and the track simultaneously. An actuator is operably coupled with the barrel and is configured to rotate the barrel. Rotation of the barrel is configured to vertically translate the inner portion relative to the outer portion.

Embodiments of this aspect of the disclosure can include any one or a combination of the following features:
- an inner portion including a concave top surface, the concave top surface defining a recess;
- a shell assembly including a rounded bottom, wherein the rounded bottom is received by a recess;
- a barrel including a lower wall positioned at a lower end of the barrel, the lower wall defining a receiving space configured to receive a coupler, and further wherein the coupler is operably coupled with an actuator;
- an inner portion of a base assembly being movable between a raised position and a lowered position;
- a bearing being positioned at a lower end of an engagement slot and positioned at a first end of a track when an inner portion is in a lowered position, wherein the bearing is positioned at an upper end of the engagement slot and is positioned at a second end of the track when the inner portion is in the raised position; and/or
- a bearing being fixedly coupled with an inner portion of a base assembly.

According to another aspect of the present disclosure, a seating assembly includes a seat base operably coupled with a seatback. A base assembly is operably coupled with the seat base. The base assembly includes an outer portion defining an opening and an engagement slot. An inner portion is positioned through the opening of the outer portion and is movable between a raised position and a lowered position relative to the outer portion. A barrel is positioned between the outer portion and the inner portion. The barrel defines a track extending circumferentially upward at a predetermined angle. A bearing is coupled with the inner portion and is translatable along the engagement slot and the track.

Embodiments of this aspect of the disclosure can include any one or a combination of the following features:
- an outer portion including an upper rim and a lower rim, wherein a first diameter of the upper rim is less than a second diameter of the lower rim;
- an inner portion including a top surface, wherein the top surface abuts an upper rim when the inner portion is in a lowered position;
- an inner portion defining a receiving well proximate a lower edge of the inner portion, the receiving well configured to receive a bearing;
- a bearing including a fastener and a low-friction bushing; and/or
- a seating assembly further including an actuator operably coupled with the barrel and configured to rotate the barrel in first and second opposing directions, wherein rotation of the barrel in the first direction moves the inner portion from the lowered position to the raised position, and further wherein rotation of the barrel in the second direction moves the inner portion from the raised position to the lowered position.

According to another aspect of the present disclosure, a seating assembly includes a seat base and a base assembly. The base assembly is operably coupled with the seat base. The base assembly includes an outer portion defining an opening and a plurality of engagement slots. An inner portion is received by the opening of the outer portion and is movable between a raised position and a lowered position relative to the outer portion. A barrel is positioned between the outer portion and the inner portion. The barrel defines a plurality of tracks extending circumferentially upward about the barrel in a first direction. Each of a plurality of bearings is coupled with one of the plurality of receiving wells and is translatable along one of the plurality of engagement slots and one of the plurality of tracks.

Embodiments of this aspect of the disclosure can include any one or a combination of the following features:
- a barrel including a lower wall positioned at a lower end of the barrel and defining a receiving space;
- a seating assembly further including a coupler positioned within a receiving space and an actuator operably coupled with the coupler and configured to rotate a barrel in a first direction and a second direction, the second direction opposite the first direction;
- each bearing including a low-friction bushing configured to form a sliding interface between the bearing and a respective engagement slot and a respective track;
- a plurality of engagement slots being circumferentially spaced about an outer portion, wherein a plurality of receiving wells are circumferentially spaced about an inner portion to correspond with the plurality of engagement slots, each of a plurality of bearings received by one of the plurality of receiving wells;
- a seat base being operably coupled with the inner portion of the base assembly; and/or
- an outer portion including an upper rim defining an opening, and further wherein the upper rim is positioned substantially flush with a top surface of an inner portion when the inner portion is in a lowered position.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings:

FIG. 1 is a side perspective view of a seating assembly, according to various examples;

FIG. 2 is a side profile view of the seating assembly of FIG. 1 showing exemplary positions of a base assembly in phantom;

FIG. 4A is a side perspective view of the base assembly of FIG. 2 in a lowered position;

FIG. 4B is a side perspective view of the base assembly of FIG. 2 in an intermediate position; and FIG. 4C is a side perspective view of the base assembly of FIG. 2 in a raised position.

DETAILED DESCRIPTION OF THE PREFERRED EMBODIMENTS

Figure 3:
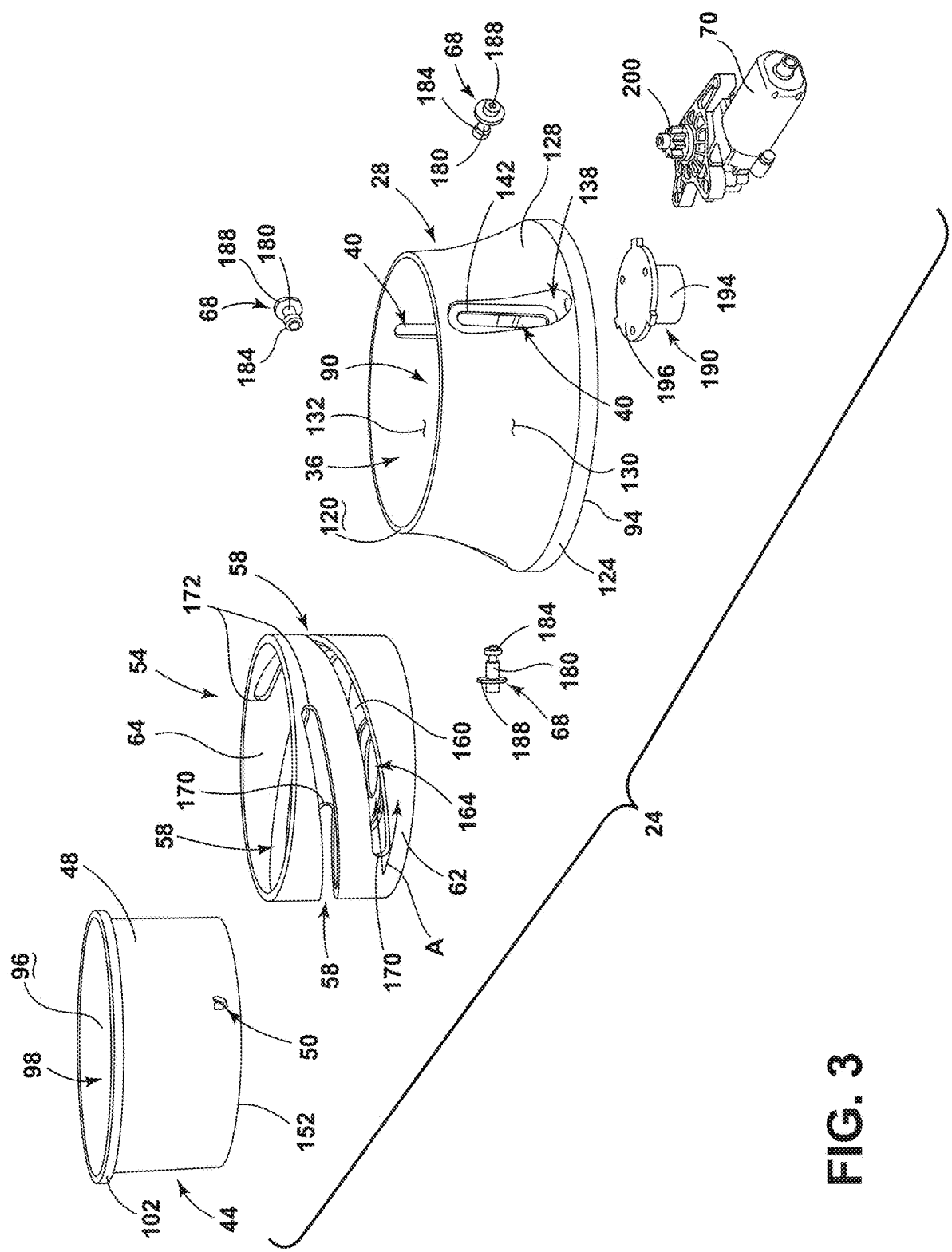
FIG. 3 is a top perspective exploded view of the base assembly of FIG. 2.

The present illustrated embodiments reside primarily in combinations of method steps and apparatus components related to a seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-4C, reference numeral 10 generally designates a seating assembly including a shell assembly 14 having a seat base 18 coupled with a seatback 20. A base assembly 24 is operably coupled with the shell assembly 14. The base assembly 24 includes an outer portion 28 having an upper rim 32 defining an opening 36. The outer portion 28 further defines a vertically extending engagement slot 40. The engagement slot 40 may be one of a plurality of engagement slots 40. An inner portion 44 of the base assemblies 24 includes a sidewall 48 and is positioned through the opening 36 of the upper rim 32. The sidewall 48 defines a receiving well 50. The receiving well 50 may be one of a plurality of receiving wells 50. A barrel 54 is positioned around the inner portion 44. The barrel 54 defines a track 58 extending helically from a lower end 62 of the barrel 54 to an upper end 64 of the barrel 54. The track 58 may be one of a plurality of tracks 58. A bearing 68 is received by the engagement slot 40, the receiving well 50, and the track 58. The bearing 68 is movable along the engagement slot 40 and the track 58 simultaneously. The bearing 68 may be one of a plurality of bearings 68. An actuator 70 is operably coupled with the barrel 54 and is configured to rotate the barrel 54. Rotation of the barrel 54 lifts, or vertically translates, the inner portion 44 relative to the outer portion 28.

Referring now to FIGS. 1 and 2, the seating assembly 10 includes the shell assembly 14 operably coupled with the base assembly 24. The shell assembly 14 includes a seatback 20 and a seat base 18. The seatback 20 and the seat base 18 may be continuously and integrally formed and may include a back panel 74. The back panel 74 may round forward on either side to form lateral profile protrusions 76. The shell assembly 14 may also include non-linear armrests 78 integrally formed with at least the back panel 74. The shell assembly 14 may be at least partially ovoid in shape. The base assembly 24 may be operably coupled with the shell assembly 14 or may be operably coupled with the seat base 18 to allow the seat base 18 to move relative to the rest of the seating assembly 10.

Referring now to FIGS. 1-3, the base assembly 24 includes the outer portion 28 operably coupled with the inner portion 44, such that the inner portion 44 is translatable between a lowered position (FIG. 4A) and a raised position (FIG. 4C) relative to the outer portion 28. As introduced above, the upper rim 32 may define the opening 36 of the outer portion 28. The opening 36 may be in communication with a cavity 90 defined by the outer portion 28 and may be sized to receive the inner portion 44. The inner portion 44 may be configured to be at least partially received within the cavity 90 defined by the outer portion 28 as the inner portion 44 moves between the raised position and the lowered position.

A top surface 96 of the inner portion 44 may define a recess 98 circumferentially framed by a lip 102. In various examples, the top surface 96 may be generally concave to define the recess 98 as a hemispherical recess. The shell assembly 14 may include a rounded bottom 106 configured to be nested within the recess 98 of the inner portion 44, such that the shell assembly 14 may be rotatably and/or slidably coupled with the inner portion 44 of the base assembly 24. For example, when the rounded bottom 106 is positioned within the recess 98 of the inner portion 44 of the base assembly 24, the shell assembly 14 may be rotatably coupled with the inner portion 44. The shell assembly 14 may be configured to rotate 360 degrees around a center axis of the seating assembly 10, as illustrated by arrows R. Further, when the rounded bottom 106 is positioned within the recess 98, the shell assembly 14 may be slidably coupled with the inner portion 44. The shell assembly 14 may be configured to slide forward and backward within the recess 98, as illustrated by arrow S. The front of the bottom 106 of the shell assembly 14 begins at a front portion 110 of the seat base 18. The bottom 106 extends rearwardly to a back portion 112 of the seat base 18, allowing the shell assembly 14 to be adjusted, as illustrated by arrow S, between a design position and a reclined position. It will be understood that the shell assembly 14 may be disposed at any angle between the design position and the reclined position.

Referring now to FIG. 3, as illustrated, the base assembly 24 includes the outer portion 28, the inner portion 44, and the barrel 54. The outer portion 28 includes the upper rim 32 and a lower rim 94. As discussed above, the upper rim 32 may define the opening 36 configured to receive the inner portion 44 of the base assembly 24. The upper rim 32 includes an upper surface 120 that extends circumferentially to frame the opening 36. The upper rim 32 of the outer portion 28 has a first diameter sized to accommodate the inner portion 44. The lower rim 94 may define an outer lip 124 extending circumferentially about the outer portion 28 and oriented perpendicular to the upper surface 120 of the upper rim 32. The lower rim 94 of the outer portion 28 has a second diameter sufficient to provide support for the shell assembly 14. The first diameter may be less than the second diameter, such that the outer portion 28 is at least partially frustoconical. The frustoconical shape may provide improved load distribution of the seating assembly 10 as the second diameter provides a larger load bearing surface of the lower rim 94 of the base assembly 24.

A sidewall 128 extends between the upper rim 32 and the lower rim 94. The sidewall 128 may include an exterior surface 130 and an interior surface 132. The exterior surface 130 of the sidewall 128 may be generally inclined upward from an upper edge of the lower rim 94 to an outer edge of the upper rim 32. The exterior surface 130 may be at least partially curved upward and inward from the lower rim 94 to the upper rim 32. The interior surface 132 of the sidewall 128 is substantially vertical. The orientation of the interior surface 132 of the sidewall 128 defines the cavity 90 of the outer portion 28 to be generally cylindrical, and the orientation of the exterior surface 130 and the interior surface 132 provides that the sidewall 128 has a larger thickness proximate the lower rim 94 and a smaller thickness proximate the upper rim 32.

The sidewall 128 defines one or more recesses 138. Each recess 138 may be elongated and extends vertically along the sidewall 128. One end of the recess 138 is positioned proximate the upper rim 32, and an opposing end of the recess 138 is positioned proximate the lower rim 94. Each recess 138 may be defined by the sidewall 128 such that the end of the recess 138 positioned proximate the upper rim 32 has a radial depth that is less than a radial depth of the opposing end of the recess 138 positioned proximate the lower rim 94.

The sidewall 128 of the outer portion 28 may define a vertically extending engagement slot 40. The engagement slot 40 may be one of a plurality of vertically extending engagement slots 40 circumferentially spaced about the outer portion 28 and in communication with the cavity 90 of the outer portion 28. The number and spacing of the recesses 138 are determined by the number and spacing of the engagement slots 40. Each recess 138 of the sidewall 128 is at least partially defined by an edge 142 extending about a perimeter of one of the vertically extending engagement slots 40. Each recess 138 is in communication with the respective engagement slot 40 so that the respective engagement slot 40 is spaced apart from the exterior surface 130 of the sidewall 128 and extends through the interior surface 132 of the sidewall 128.

As discussed above and illustrated in FIG. 3, the inner portion 44 is received through the opening 36 into the cavity 90 of the outer portion 28. The inner portion 44 may be generally cylindrical and may have a cross-sectional diameter that is less than the first diameter of the upper rim 32, so that the inner portion 44 may be movable between the raised position and the lowered position relative to the outer portion 28. In other words, the inner portion 44 may be positioned through the opening 36 of the upper rim 32 or at least partially received by the upper rim 32.

The inner portion 44 includes the top surface 96 and the sidewall 48. The sidewall 48 extends circumferentially about the top surface 96 and downward from the lip 102 of the top surface 96. The top surface 96 defines the recess 98. The lip 102 extends about the perimeter of the top surface 96 to frame the recess 98 and may protrude radially from the top surface 96 and away from the sidewall 48. The lip 102 may be sized to complement the upper rim 32 of the outer portion 28, as discussed elsewhere herein.

The sidewall 48 may define the receiving well 50 proximate a lower edge 152 of the inner portion 44. In various examples, the sidewall 48 may define a plurality of receiving wells 50. The number and spacing of the plurality of receiving wells 50 may be selected to correspond with the number and spacing of the plurality of engagement slots 40 and the plurality of recesses 138. In other words, each of the plurality of receiving wells 50 may be circumferentially spaced about the inner portion 44 to correspond with the plurality of engagement slots 40. As introduced above, each of the receiving wells 50 is sized to at least partially receive a bearing 68 to couple the bearing 68 to the inner portion 44. The bearings 68 may be removably coupled to the inner portion 44 or may be fixedly coupled to the inner portion 44.

Referring still to FIG. 3, the barrel 54 may be sized to receive the inner portion 44. The barrel 54 is received by the cavity 90 of the outer portion 28 and is positioned between the inner portion 44 and the outer portion 28 of the base assembly 24. Specifically, the barrel 54 is positioned between the sidewall 48 of the inner portion 44 and the interior surface 132 of the sidewall 128 of the outer portion 28. The barrel 54 may have a lower end 62 and an upper end 64 and may be positioned around the inner portion 44 such that the barrel 54 is substantially flush with the sidewall 48 of the inner portion 44. The upper end 64 of the barrel 54 may be an open end configured to receive the inner portion 44. The upper end 64 of the barrel 54 may be positioned to selectively abut the lip 102 of the inner portion 44 when the inner portion 44 is received by the barrel 54. The lower end 62 of the barrel 54 may include a lower wall 160 defining a receiving space 164. In various examples, the receiving space 164 may be aligned with a central axis of the barrel 54. In other examples, the receiving space 164 may be defined in any position by the lower wall 160, such that the receiving space 164 may be used to rotate the barrel 54, as discussed elsewhere herein.

The barrel 54 may further define the track 58 extending circumferentially about the barrel 54. In various examples, the track 58 may be one of a plurality of tracks 58 positioned parallel to one another. Each track 58 includes a first end 170 positioned proximate the lower end 62 of the barrel 54 and a second end 172 positioned proximate the upper end 64 of the barrel 54. The plurality of tracks 58 may be spaced circumferentially. The spacing between the first ends 170 of neighboring tracks 58 and the spacing between the second ends 172 of neighboring tracks 58 both correspond to the spacing between the engagement slots 40 and receiving wells 50. Each track 58 is defined to extend helically from the lower end 62 of the barrel 54 to the upper end 64 of the barrel 54. In other words, each track 58 extends circumferentially upward from the lower end 62 of the barrel 54 to the upper end 64 of the barrel 54 in a first direction and/or at a predetermined angle A. The angle A may be any angle less than 90 degrees. The length of each track 58 is configured to allow a bearing 68 to move from the first end 170 to the second end 172 within 180 degrees or less of rotation.

Referring still to FIG. 3, the bearing 68 may be a single bearing 68 or one of a plurality of bearings 68. Each bearing 68 is received by a respective receiving well 50 of the inner portion 44. The bearing 68 is coupled with the inner portion 44, such that the bearing 68 is not movable relative to the inner portion 44. Coupling the bearing 68 with the inner portion 44 allows the inner portion 44 to be movable in conjunction with the bearing 68, as discussed elsewhere herein. Each bearing 68 may include a bushing 180 coupled with a fastener 184. The fastener 184 may be sized to extend through the respective receiving well 50 to couple the bushing 180 to the inner portion 44. The fastener 184 may be at least partially received by the bushing 180 to couple the bushing 180 to the inner portion 44.

The bushing 180 may be a low-friction bushing 180 sized to be received by the respective engagement slot 40 of the outer portion 28 and the respective track 58 of the barrel 54. The bushing 180 may include a shoulder 188 extending circumferentially and outward from the bushing 180. The bushing 180 may be positioned through the respective engagement slot 40 of the outer portion 28 and the respective track 58 of the barrel 54, such that the shoulder 188 abuts the edge 142 surrounding the engagement slot 40. The bushing 180 may include a low-friction surface configured to slide along the respective track 58 of the barrel 54 and the respective engagement slot 40 of the outer portion 28. The low-friction surface of the bushing 180 may reduce friction between the bushing 180 and the barrel 54 and the outer portion 28 to provide a sliding interface between the bushing 180 and the barrel 54 and/or the outer portion 28. The bushing 180 may include grease or any other lubricant to facilitate movement of the bushing 180 along the respective track 58 of the barrel 54 and the respective engagement slot 40 of the outer portion 28.

A coupler 190 is received by the receiving space 164 defined by the lower wall 160 of the barrel 54. In various examples, the coupler 190 may be a bearing, a gear, or any other connector configured to couple the barrel 54 with the actuator 70. The coupler 190 may have a body 194 extending from a top plate 196. The body 194 may be positioned through the receiving space 164, such that the top plate 196 abuts the lower wall 160 of the barrel 54. The top plate 196 of the coupler 190 may be coupled with the lower wall 160 using, for example, welding, fasteners, or adhesive, or the top plate 196 may be integrally formed with the lower wall 160 such that the coupler 190 is integral with the barrel 54.

The actuator 70 is operably coupled with the coupler 190 by a pinion 200 extending from and rotatable by the actuator 70. In various examples, the pinion 200 may be engaged with the body 194 of the coupler 190. In other examples, the pinion 200 may be engaged with a rim, outer surface, or any other piece of the coupler 190 configured to provide rotation of the coupler 190 by the pinion 200. The actuator 70 may be operably coupled to the barrel 54 by way of the engagement of the pinion 200 with the coupler 190 and may be configured to rotate the barrel 54 by rotating the pinion 200 and, subsequently, providing rotation of the coupler 190. In various examples, the actuator 70 may be a motor.

Referring now to FIGS. 3-4C, the inner portion 44 is movable between the lowered position (FIG. 4A) and the raised position (FIG. 4C). When the inner portion 44 is in the lowered position, the lip 102 of the top surface 96 may abut the upper surface 120 of the upper rim 32 of the outer portion 28. In other words, the upper rim 32 may be substantially flush with the lip 102 of the top surface 96 when the inner portion 44 is in the lowered position. The inner portion 44 is fully received by the cavity 90 of the outer portion 28 when the inner portion 44 is in the lowered position.

When the actuator 70 is coupled with the barrel 54, the actuator 70 may be configured to rotate the barrel 54 about the inner portion 44. Rotation of the barrel 54 results in lifting, or the vertical translation of, the inner portion 44 through the opening 36 and out of the cavity 90 relative to the outer portion 28. Specifically, rotation of the barrel 54 in a first direction by the actuator 70 results in the inner portion 44 moving from the lowered position to the raised position, and rotation of the barrel 54 in a second direction by the actuator 70 results in the inner portion 44 moving from the raised position to the lowered position when the second direction is opposite the first direction. Rotation of the barrel 54 by the actuator 70 is configured to move the inner portion 44 from the lowered position to the raised position, or vice versa, in 180 degrees of rotation or less. The distance traveled by the inner portion 44 between the lowered position and the raised position may be at least about 100 mm.

Each bearing 68 is movable along one of the engagement slot 40 of the outer portion 28 and the corresponding track 58 of the barrel 54 simultaneously by way of the bushing 180. In other words, each bearing 68 is translatable along the respective engagement slot 40 and the respective track 58. When the inner portion 44 is in the lowered position (FIG. 4A), the bearing 68 is positioned at a lower end of the respective engagement slot 40 and at the first end 170 of the respective track 58. As the barrel 54 is rotated about the inner portion 44 by the actuator 70, the rotation of the barrel 54 guides the bushing 180 of each bearing 68 along the respective track 58 from the first end 170 toward the second end 172. As the bushing 180 slides along the respective track 58, the bearing 68 rises along the respective engagement slot 40. When the bushing 180 reaches the second end 172 of the respective track 58, the inner portion 44 is in the raised position (FIG. 4C), and the bearing 68 is positioned at an upper end of the respective engagement slot 40. It will be understood that the inner portion 44 may be positioned at any height between the lowered position in the raised position, as illustrated in FIG. 4B. Anti-rotation of the barrel 54 may be provided by a transmission of the actuator 70 to prevent inadvertent lifts and/or drops of the inner portion 44 in static situations. The range of adjustment of the inner portion 44 between the lowered position and the raised position allows a user to adjust the height of the seating assembly 10 (FIG. 1), as desired based on preference and/or floor height.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A seating assembly comprising:
    a shell assembly having a seat base coupled with a seatback; and
    a base assembly operably coupled with the shell assembly, the base assembly comprising:
        an outer portion defining an opening and a vertically extending engagement slot;
        an inner portion positioned through the opening of the outer portion, the inner portion including a sidewall defining a receiving well;
        a barrel positioned around the inner portion, the barrel defining a track extending helically from a lower end of the barrel to an upper end of the barrel;
        a bearing received by the engagement slot, the receiving well, and the track, wherein the bearing is movable along the engagement slot and the track simultaneously; and
        an actuator operably coupled with the barrel and configured to rotate the barrel, wherein rotation of the barrel is configured to vertically translate the inner portion relative to the outer portion.

2. The seating assembly of claim 1, wherein the inner portion includes a concave top surface, the concave top surface defining a recess.

3. The seating assembly of claim 2, wherein the shell assembly includes a rounded bottom, and further wherein the rounded bottom is received by the recess.

4. The seating assembly of claim 1, wherein the barrel includes a lower wall positioned at the lower end of the barrel, the lower wall defining a receiving space configured to receive a coupler, and further wherein the coupler is operably coupled with the actuator.

5. The seating assembly of claim 1, wherein the inner portion of the base assembly is movable between a raised position and a lowered position.

6. The seating assembly of claim 5, wherein the bearing is positioned at a lower end of the engagement slot and is positioned at a first end of the track when the inner portion is in the lowered position, and further wherein the bearing is positioned at an upper end of the engagement slot and is positioned at a second end of the track when the inner portion is in the raised position.

7. The seating assembly of claim 1, wherein the bearing is fixedly coupled with the inner portion of the base assembly.

8. A seating assembly comprising:
    a seat base operably coupled with a seatback; and
    a base assembly operably coupled with the seat base, the base assembly comprising:
        an outer portion defining an opening and an engagement slot;
        an inner portion positioned through the opening of the outer portion and movable between a raised position and a lowered position relative to the outer portion;
        a barrel positioned between the outer portion and the inner portion, the barrel defining a track extending circumferentially upward at a predetermined angle; and
        a bearing coupled with the inner portion and translatable along the engagement slot and the track.

9. The seating assembly of claim 8, wherein the outer portion includes an upper rim and a lower rim, and further wherein a first diameter of the upper rim is less than a second diameter of the lower rim.

10. The seating assembly of claim 9, wherein the inner portion includes a top surface, and further wherein the top surface abuts the upper rim when the inner portion is in the lowered position.

11. The seating assembly of claim 8, wherein the inner portion defines a receiving well proximate a lower edge of the inner portion, the receiving well configured to receive the bearing.

12. The seating assembly of claim 8, wherein the bearing includes a fastener and a low-friction bushing.

13. The seating assembly of claim 8, further comprising:
    an actuator operably coupled with the barrel and configured to rotate the barrel in first and second opposing directions, wherein rotation of the barrel in the first direction moves the inner portion from the lowered position to the raised position, and further wherein rotation of the barrel in the second direction moves the inner portion from the raised position to the lowered position.

14. A seating assembly comprising:
    a seat base; and
    a base assembly operably coupled with the seat base, the base assembly comprising:
        an outer portion defining an opening and a plurality of engagement slots;
        an inner portion received by the opening of the outer portion and movable between a raised position and a lowered position relative to the outer portion;
        a barrel positioned between the outer portion and the inner portion, the barrel defining a plurality of tracks extending circumferentially upward about the barrel in a first direction; and a plurality of bearings, each bearing coupled with the inner portion and translatable along one of the plurality of engagement slots and one of the plurality of tracks.

15. The seating assembly of claim 14, wherein the barrel includes a lower wall positioned at a lower end of the barrel and defining a receiving space.

16. The seating assembly of claim 15, further comprising:
a coupler positioned within the receiving space; and
an actuator operably coupled with the coupler and configured to rotate the barrel in the first direction and a second direction, the second direction opposite the first direction.

17. The seating assembly of claim 16, wherein each bearing includes a low-friction bushing configured to form a sliding interface between the bearing and the respective engagement slot and the respective track.

18. The seating assembly of claim 14, wherein the plurality of engagement slots are circumferentially spaced about the outer portion, and further wherein a plurality of receiving wells are circumferentially spaced about the inner portion to correspond with the plurality of engagement slots, each of the plurality of bearings received by one of the plurality of receiving wells.

19. The seating assembly of claim 14, wherein the seat base is operably coupled with the inner portion of the base assembly.

20. The seating assembly of claim 14, wherein the outer portion includes an upper rim defining the opening, and further wherein the upper rim is positioned substantially flush with a top surface of the inner portion when the inner portion is in the lowered position.

* * * * *